United States Patent
Ismail

(10) Patent No.: US 11,218,310 B2
(45) Date of Patent: Jan. 4, 2022

(54) METHOD AND ARRANGEMENT FOR ENCODING/DECODING A SIGNAL AT A FIRST AND SECOND COMMUNICATION NODE IN A ROAD VEHICLE

(71) Applicant: ZENUITY AB, Gothenburg (SE)

(72) Inventor: Sameel Kassim Ismail, Markgroeningen (DE)

(73) Assignee: ZENUITY AB, Gothenburg (SE)

( * ) Notice: Subject to any disclaimer, the term of this patent is extended or adjusted under 35 U.S.C. 154(b) by 180 days.

(21) Appl. No.: 16/556,455

(22) Filed: Aug. 30, 2019

(65) Prior Publication Data

US 2020/0076599 A1    Mar. 5, 2020

(30) Foreign Application Priority Data

Aug. 31, 2018  (EP) .................................... 18192014

(51) Int. Cl.
  *H04L 9/12*  (2006.01)
  *G07C 5/08*  (2006.01)
  (Continued)

(52) U.S. Cl.
  CPC .............. *H04L 9/12* (2013.01); *G07C 5/0808* (2013.01); *G07C 5/0816* (2013.01); *H04W 4/48* (2018.02);
  (Continued)

(58) Field of Classification Search
  CPC ....... H04L 9/12; G07C 5/0808; G07C 5/0816; H04W 4/48
  See application file for complete search history.

(56) References Cited

U.S. PATENT DOCUMENTS

| | | |
|---|---|---|
| 2004/0064221 A1 | 4/2004 | DePrez et al. |
| 2007/0130469 A1 | 6/2007 | Alrabady |
| | (Continued) | |

FOREIGN PATENT DOCUMENTS

GB       2541657 A  *  3/2017  ......... G08B 21/0205

OTHER PUBLICATIONS

Zelle et al., "On Using TLS to Secure In-Vehicle Networks", ARES, Aug. 29-Sep. 2017, 10 pages.

*Primary Examiner* — Ellen Tran
(74) *Attorney, Agent, or Firm* — Duane Morris LLP; Gregory M. Lefkowitz; Joaquin Hernandez

(57) ABSTRACT

Method for encoding/decoding a signal at a first and second communication node (N1; N2) in a road vehicle. A signal (1) from an on-board sensor (10) is encoded using a first encoding scheme (a), encoding the formed single encoded sensor signal (1a) using a second encoding scheme (b), decoding this double encoded sensor signal (1ab) in the second communication node (N2) based on the second encoding scheme (b), forming a decoded single encoded sensor signal (1a'). In the first communication node (N2), performing a comparison analysis, comprising at least one of the following: comparing the decoded single encoded sensor signal (1a') with a stored single encoded sensor signal (1a), or after encoding the decoded single encoded sensor signal (1a') with the second encoding scheme (b) comparing (110) the thus formed double encoded sensor signal (1a'b) with a stored double encoded sensor signal (1ab). If the compared sensor signals (1a',1a; 1 ab,1a'b) match, then sending (111) a signal to the second communication node (N2) validating the sensor signal (1), and if they do not match, then initiating (112) a corrective action.

15 Claims, 4 Drawing Sheets

(51) Int. Cl.
*H04W 12/00* (2021.01)
*H04W 4/48* (2018.01)

(52) U.S. Cl.
CPC ....... *H04W 12/009* (2019.01); *H04L 2209/80* (2013.01); *H04L 2209/84* (2013.01)

(56) References Cited

U.S. PATENT DOCUMENTS

| | | | |
|---|---|---|---|
| 2008/0231434 A1* | 9/2008 | Hermann | H04B 10/1141 340/431 |
| 2014/0380037 A1* | 12/2014 | Matsuda | H04L 9/0618 713/150 |
| 2017/0244594 A1 | 8/2017 | Shiota et al. | |
| 2017/0250961 A1 | 8/2017 | Rasbornig | |
| 2018/0212780 A1* | 7/2018 | Talamonti | H04L 9/3247 |
| 2019/0199524 A1* | 6/2019 | Takemori | H04L 9/0894 |

\* cited by examiner

METHOD AND ARRANGEMENT FOR ENCODING/DECODING A SIGNAL AT A FIRST AND SECOND COMMUNICATION NODE IN A ROAD VEHICLE

CROSS-REFERENCE TO RELATED APPLICATIONS

This application claims priority to European Patent Application No. EP18192014.1, filed Aug. 31, 2018, the entire contents of which are incorporated herein by reference.

TECHNICAL FIELD

The disclosure is related to a method and arrangement for encoding/decoding a signal at a first and second communication node in a road vehicle, the signal originating from an on-board sensor on the road vehicle detecting environmental information associated with the road vehicle.

BACKGROUND

Autonomous vehicles rely on their on-board sensors, e.g. radars, lidars, cameras, etc., to detect surrounding objects and to understand their environment. Valid and accurate sensor data is required to make appropriate driving decisions such as emergency brake, changing trajectory or rerouting. The on-board sensors communicate with a control module of the vehicle and the control module directs the appropriate vehicle component based on the message received. A hacker may gain unauthorized access to the vehicle and send messages to the control module to perform a particular function. To hinder or limit the number of such attacks, the vehicle identification number (VIN) that uniquely identifies a vehicle may be assigned to messages sent to a control module.

US2004064221 (A1) discloses the use of the VIN to identify a wireless message that applies to a vehicle that has been assigned the same VIN to ensure that the particular vehicle is directed only based on actions by the driver of that particular vehicle. An action by the driver of the vehicle is detected by the sensor module and communicated to the control module using a message sent using a wireless communication pathway. The control module directs the appropriate vehicle component based on the wireless message received. The vehicle identification number (VIN) that uniquely identifies the vehicle is used to identify a wireless message which has been sent from a sensor module that is part of the vehicle. The use of the VIN to identify a wireless message that applies to a particular vehicle that has been assigned the same VIN may help ensure that the particular vehicle is directed only based on actions by the driver of the particular vehicle.

US2007130469 (A1) also discusses the concept of having a vehicle control module accept a message and perform a function only if it's vehicle identification number (VIN) is part of a received encrypted message. In this document the encoding also comprises a clock signal to assure that the vehicle and server receive proper messages. The vehicle and the server will periodically synchronize their internal clocks to a global clock signal. The server will add its local time to the body of a message including a vehicle identification number and a function code. The server will then encrypt the message and transmit it to the vehicle. The vehicle will decrypt the message and compare the transmitted vehicle identification number with its identification number. If the identification numbers match, the vehicle will then see if the time in the message is within a predefined window of the vehicle time. If the transmitted time is within the predefined window of the vehicle time, the vehicle will accept the message and perform the function. The concept of US2007130469(A1) is, hence, involving messages with two layers of security, VIN number and time.

The messages of US2007130469(A1) provided with two layers of security makes it more difficult for a hacker to gain unauthorized access to the vehicle. It is desirable, though, to make it even more difficult for a hacker to gain access to a vehicle.

SUMMARY

An object of the present invention is to provide a method and arrangement for encoding/decoding a signal at a first and second node in a road vehicle, which method makes it difficult for a hacker to get unauthorized access to the vehicle. The invention is defined by the appended independent claims. Embodiments are set forth in the appended dependent claims and in the figures.

According to a first aspect there is provided a method for encoding/decoding a signal at a first and second communication node in a road vehicle. The method comprises, by means of an on-board sensor on the road vehicle, detecting environmental information associated with the road vehicle, and in the first communication node a signal representing the detected environmental information associated with the road vehicle is encoded using a first encoding scheme and thereafter the thus formed single encoded sensor signal is encoded using a second encoding scheme. The formed double encoded sensor signal is sent to the second communication node, and at least one of the single encoded sensor signal and the double encoded sensor signal is stored in the first communication node. In the second communication node the double encoded sensor signal received from the first communication node is decoded based on the second encoding scheme, forming a decoded single encoded sensor signal, and the decoded single encoded sensor signal is sent to the first communication node. In the first communication node a comparison analysis is performed, comprising at least one of the following: comparing the decoded single encoded sensor signal received from the second communication node with a stored single encoded sensor signal, or after encoding the decoded single encoded sensor signal received from the second communication node with the second encoding scheme, comparing the thus formed double encoded sensor signal with a stored double encoded sensor signal. If the compared sensor signals match, a signal is sent to the second communication node validating the sensor signal. If the compared sensor signals do not match, a corrective action is initiated.

The sensor signal is by means of the present method provided with two layers of security, the first layer is the sensor signal being encoded using the first encoding scheme and the second layer is the sensor signal being encoded using the second encoding scheme.

The comparison performed of the signal from the second communication node, alternatively first encoded with the second encoding scheme, and the signal stored in the first communication node (single encoded or double encoded) is dependent on the implementation and the data type of the signal.

That the sensor signals match is here meant that they are equal, the same. It is thereby confirmed that the sensor signal has not been tampered with, e.g. through a hacker attack. Once confirmed that the signals match, a signal is sent to the second communication node validating the sensor signal. The second communication node may be associable with e.g. a control module of the road vehicle and may perform an action associated with the detected environmental information associated with the road vehicle, e.g. blind spot alerting, automatic lane centring, automatic braking, traffic warnings, lane departure warning, automatic lighting, adaptive cruise control etc.

That the sensor signals do not match, i.e. they are not the same, is a warning that the sensor signal has been subject to e.g. a hacker attack.

With the present method a generalized security attack on road vehicles is impossible since each and every vehicle requires individual attacks along with low spread rate.

In a first embodiment, the comparison analysis may comprise comparing the decoded single encoded sensor signal with a stored single encoded sensor signal.

In a second embodiment, the comparison analysis may comprise after encoding the decoded single encoded sensor signal received from the second communication node with the second encoding scheme, comparing the thus formed double encoded sensor signal with a stored double encoded sensor signal.

The first encoding scheme may be a sensor identification code.

The second encoding scheme may be an encryption based on a vehicle identification number of the road vehicle.

An encryption key used in the encryption may be based on one or more of: date of manufacture of the on-board sensor, date of installation of the on-board sensor in the road vehicle, location of manufacturing of the on-board sensor, location of installation of the on-board sensor in the road vehicle, an on-board sensor manufacturing property, and an on-board sensor installation property.

The encryption may be performed using an advanced encryption standard (AES) method.

The encryption may include a dynamically changing encryption key. Thereby, the encryption key does not remain the same throughout the life cycle of the method.

The corrective action may comprise resending the double encoded sensor signal from the first communication node to the second communication node.

The corrective action may comprise shutting down the on-board sensor. By shutting down the sensor the spread of a hacker attack to other systems in the vehicle and to other vehicles connected with the affected vehicle may be slowed down.

The corrective action may comprise shutting down the road vehicle. By shutting down the road vehicle the spread of a hacker attack between connected road vehicles may be slowed down.

Upon receiving the validating signal from the first communication node in the second communication node, a decoded single encoded sensor signal stored in the second communication node may be decoded based on the first encoding scheme and an action based on the thus formed double decoded sensor signal may be initiated. Through this decoding process performed in the second communication node the original sensor signal may be obtained, based on which an action associated with the detected environmental information associated with the road vehicle may be initiated.

According to a second aspect there is provided an arrangement for encoding/decoding a signal at a first and second communication node in a road vehicle. The arrangement comprises a first communication node and a second communication node and at least one on-board sensor on the road vehicle, arranged to detect environmental information associated with the road vehicle. The first communication node is arranged to: in a first encoding unit, encode a signal representing the detected environmental information associated with the road vehicle using a first encoding scheme, and further encode the formed single encoded sensor signal using a second encoding scheme, and send the thus formed double encoded sensor signal to the second communication node, and in a storing unit store at least one of the single encoded sensor signal and the double encoded sensor signal. The second communication node is arranged to in a decoding unit decode the double encoded sensor signal received form the first communication node based on the second encoding scheme, forming a decoded single encoded sensor signal, and send the decoded single encoded sensor signal to the first communication node. The first communication node is further arranged to in an analysis unit perform a comparison analysis comprising at least one of the following actions: compare the decoded single encoded sensor signal received from the second communication node with a single encoded sensor signal stored in the storing unit, or compare, subsequent to encoding the decoded single encoded sensor signal received from the second communication node with the second encoding scheme in a second encoding unit, the thus formed double encoded sensor signal with a double encoded sensor signal stored in the storing unit. If the compared sensor signals match, then send a signal to the second communication node validating the sensor signal, if the compared sensor signals do not match, then initiate a corrective action.

The first communication node may comprise the at least one on-board sensor. Alternatively, the on-board sensor may comprise the first communication node. The on-board sensor may alternatively be separate from the first communication node, wherein the on-board sensor send detected environmental information associated with the road vehicle to the first communication node.

The first and second encoding units may be the same encoding unit. Alternatively, the first and second encoding units may be different encoding units.

According to a third aspect there is provided a road vehicle comprising the arrangement for encoding/decoding a signal at a first and second communication node described above.

DETAILED DESCRIPTION

Figure 1:
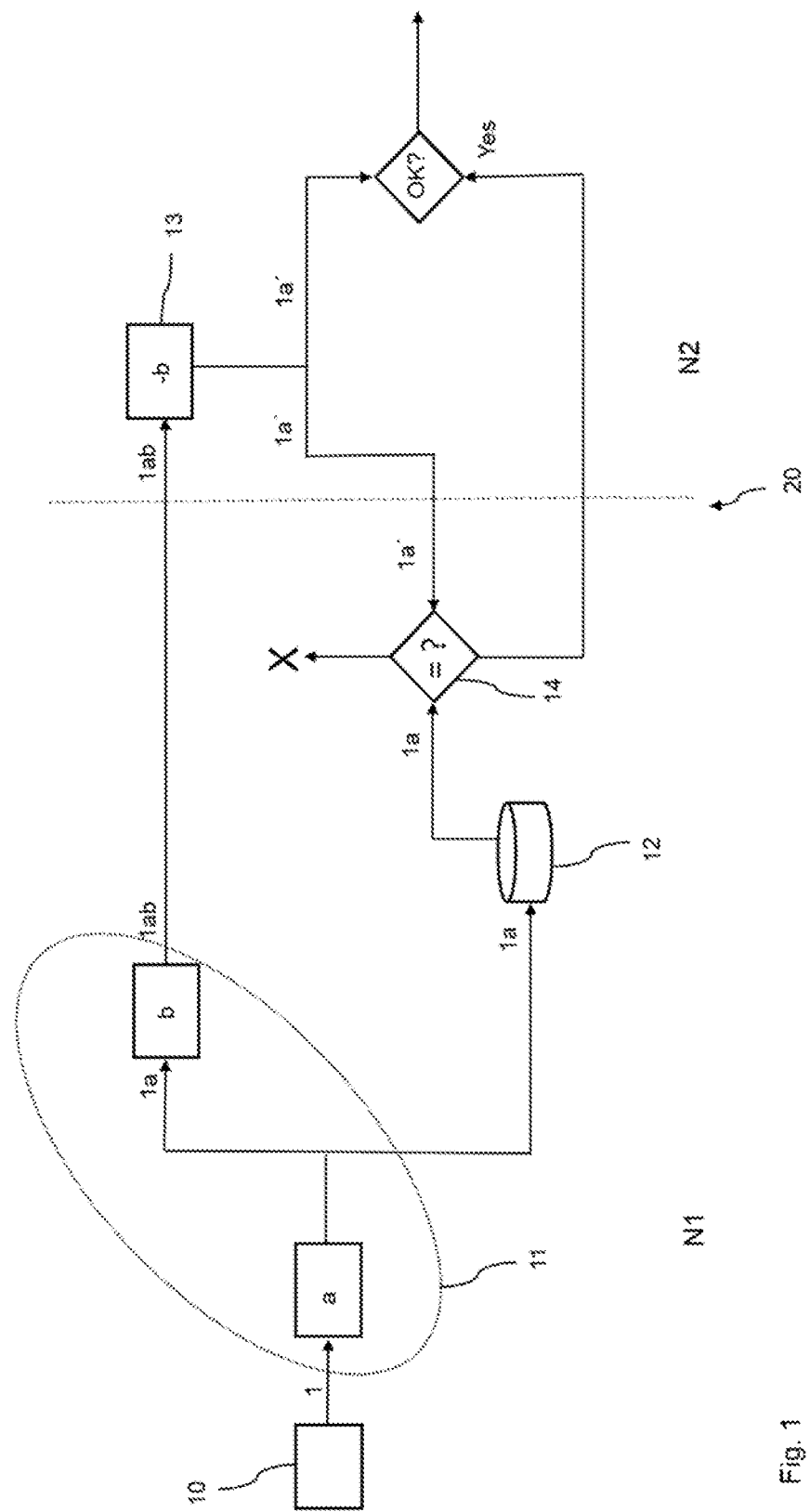
FIG. 1 is a scheme of a method/arrangement for encoding/decoding a signal at a first and second communication node in a road vehicle.

Autonomous driving (AD) vehicles and vehicles with advanced driving assistance systems (ADAS) rely on their on-board sensors, e.g. radars, lidars, cameras, etc., to detect surrounding objects and to understand their environment. Valid and accurate sensor data is necessary to make appropriate driving decisions such as emergency brake, changing trajectory or rerouting based on such sensor data. To hinder that a hacker gains unauthorized access to the vehicle by hacking sensor messages or sending fake sensor messages, a method and arrangement 20, 20' shown in FIGS. 1-3 may be used.

The method and arrangement 20, 20' comprise a first and second communication node N1, N2 arranged in a road vehicle (vehicle not shown in the figures) and at least one on-board sensor 10 on the road vehicle. The road vehicle may an AD or ADAS car, bus, truck etc. The on-board sensor 10 is arranged to detect 101 environmental information associated with the road vehicle. Such sensors may e.g. detect a location of the vehicle, a velocity of the vehicle, an orientation of the vehicle, heading angle of the vehicle, and a status of surroundings of the vehicle. The on-board sensor 10 may be a radar sensor, a lidar sensor, a camera, an ultrasound sensor, etc. The first communication node N1 may be associated with the on-board sensor 10. The second communication node N2 may be associable with e.g. a control module (not shown) of the road vehicle, which based on data from the on-board sensor 10 performs a particular function.

In a first encoding unit 11 a signal 1 representing the detected environmental information associated with the road vehicle is encoded 102 using a first encoding scheme a. The first encoding scheme a may be a sensor identification code, which may be unique for each sensor. The sensor identification code could uniquely identify the on-board sensor 10 for both the supplier and the vehicle manufacturer. The code, which may be a sensor property, could be based on the production method and/or end of line process at the sensor manufacturer/supplier.

The formed single encoded sensor signal 1a is in the first encoding unit 11 further encoded 103 using a second encoding scheme b. The second encoding scheme b may be an encryption based on a vehicle identification number of the road vehicle. A vehicle identification number (VIN) is the identifying code for a specific vehicle. The VIN may serve as the fingerprint of the vehicle, as no two vehicles in operation have the same VIN. A VIN may be composed of 17 characters (digits and capital letters) that act as a unique identifier for the vehicle. A VIN displays the vehicle's unique features, specifications and manufacturer. For this encryption an encryption key may be used based on one the date of manufacture of the on-board sensor 10, the date of installation of the on-board sensor 10 in the road vehicle, the location of manufacturing of the on-board sensor 10, the location of installation of the on-board sensor 10 in the road vehicle, a sensor manufacturing property, and a sensor installation property. There are infinite combinations for encryption key generation. One can argue that the encryption key may be generated by using yet another encryption key. Therefore, the possibilities are infinite. The encryption may be performed using an advanced encryption standard (AES) method, e.g. 256-bit. In the future there may be other useful standard methods. The encryption key may be applied through over the air updates to the relevant communication node(s) and to a gateway in between said communication nodes N1, N2. There could be cases where there is a dedicated Com channel between the first and second communication nodes N1, N2.

The encryption may in embodiments thereof include a dynamically changing encryption key. Thereby, the encryption key does not remain the same throughout the life cycle of the method/arrangement. For example, if it is known that the server/system of the end of line of a sensor supplier has been compromised due to e.g. internal security flaws/sabotage, instead of having to recall the vehicles, the sensor supplier can change the encryption key over the air. Thereby rendering the compromised data usage ineffective for hacking. Such an encryption key may be generated based on service being called. Sensor suppliers have to provide hardware security modules where the service based dynamic encryption keys are stored. Alternatively, different encryption methods and encryption keys could be provided "over the air" from the sensor supplier and/or the vehicle manufacturer.

The formed double encoded sensor signal 1ab is sent 104 to the second communication node N2. The sensor signal 1 received in the second communication node N2 is, hence, provided with two layers of security, the first layer is the sensor signal being encoded using the first encoding scheme a and the second layer is the sensor signal being encoded using the second encoding scheme b.

Figure 2:
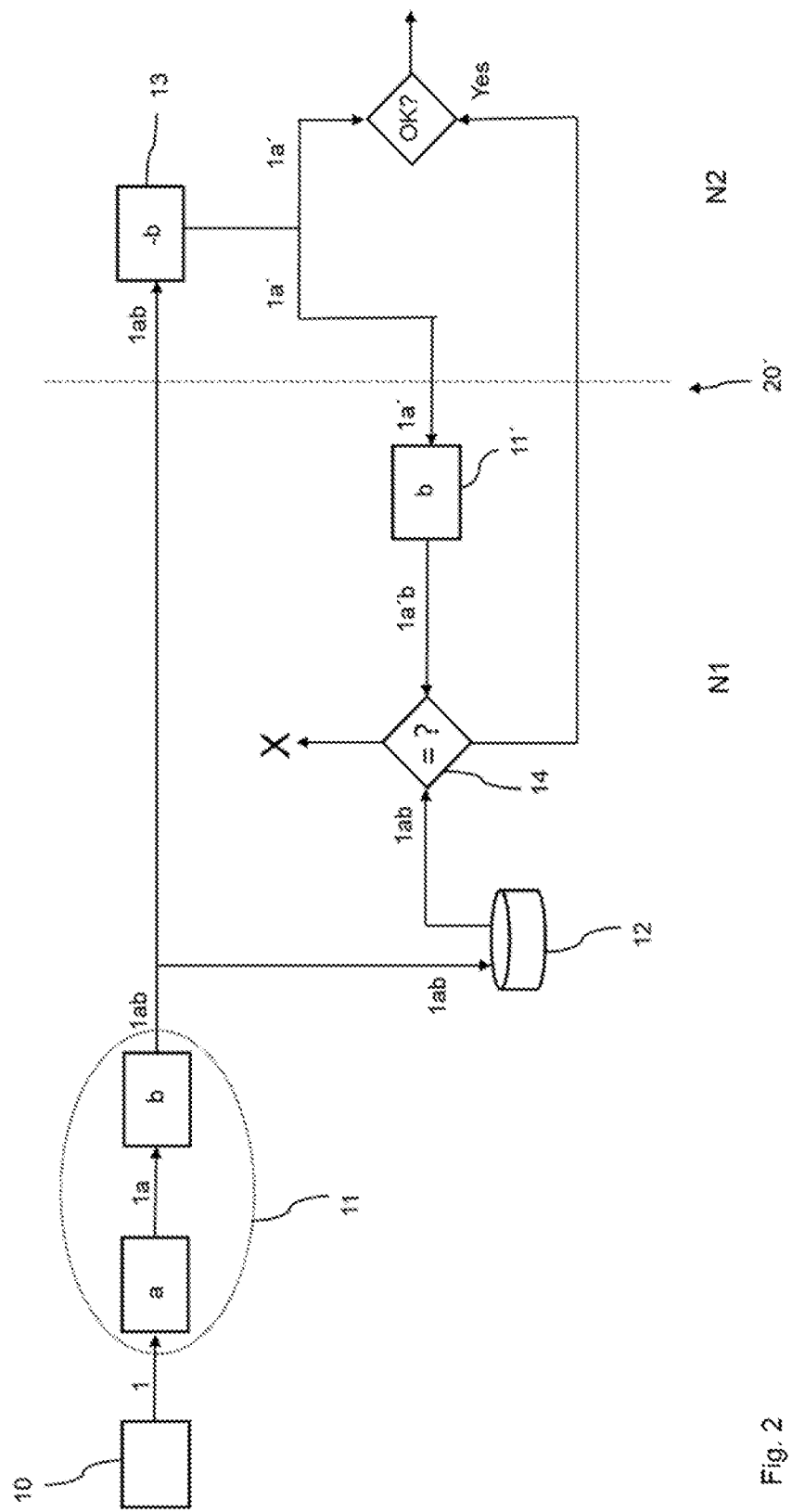
FIG. 2 is an alternative scheme of a method/arrangement for encoding/decoding a signal at a first and second communication node in a road vehicle.
Figure 3:
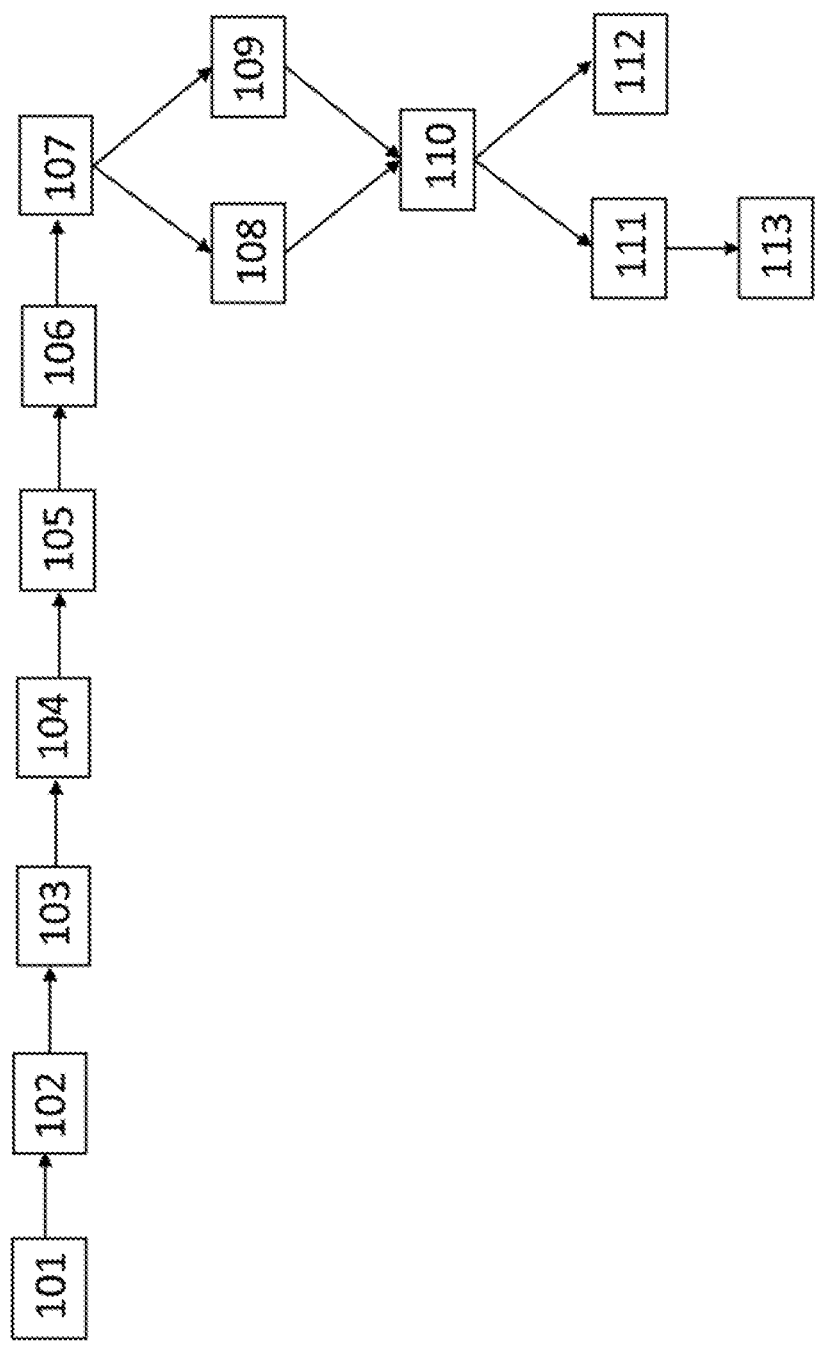
FIG. 3 is a flow chart of the methods shown in FIGS. 1 and 2.
Figure 4:
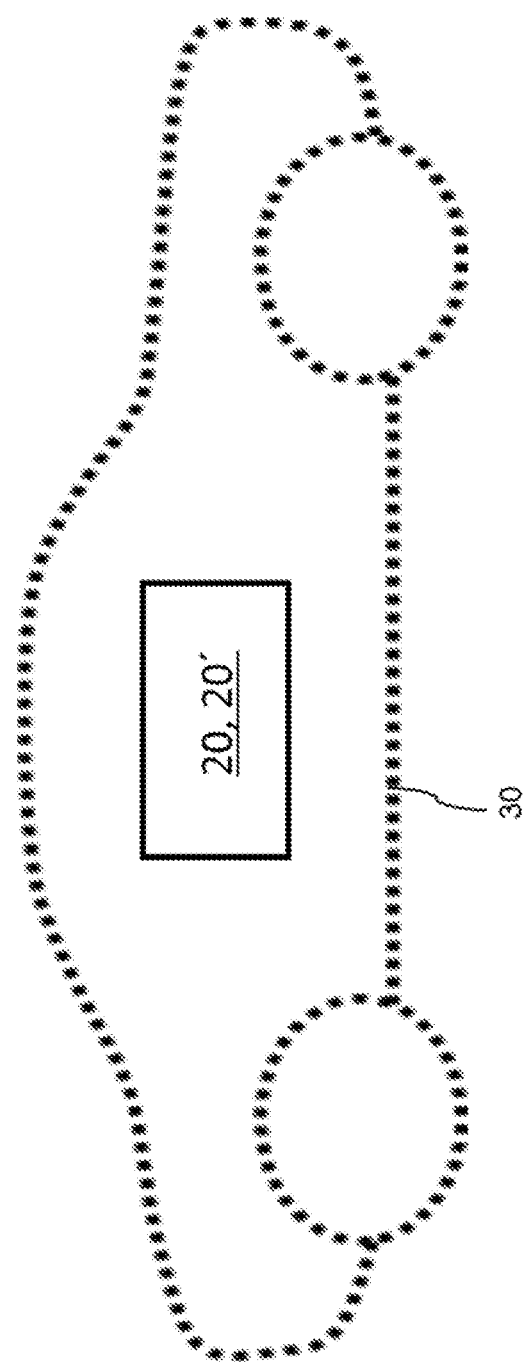
FIG. 4 is a road vehicle comprising the arrangement shown in FIG. 1 or FIG. 2.

The communication between the first N1 and second communication node N2 may be a wireless communication. The communication between the first N1 and second communication node N2 may take place on a shared data channel (not shown). Alternatively, communication between the first N1 and second communication node N2 may take place on separate data channels (as shown in FIGS. 1 and 2).

In a storing unit 12 in the first communication node N1 at least one of the single encoded sensor signal 1a and the double encoded sensor signal 1ab may be stored 105. In FIG. 1 is shown an embodiment of the arrangement 20 wherein the single encoded sensor signal 1a is stored in the storing unit 12. In FIG. 2 is shown another embodiment of the arrangement 20' in which the double encoded sensor signal 1ab is stored in the storing unit 12. It is also possible, but not shown in the figures, that both the single 1a and double encoded sensor signals 1ab are stored in the storing unit 12 or stored in separate storing units.

In a decoding unit 13 in the second communication node N2 the double encoded sensor signal 1ab received form the first communication node N1 is decoded 106 based on the second encoding scheme b, thereby forming a decoded single encoded sensor signal 1a'.

Thereafter the decoded single encoded sensor signal 1a' is sent 107 to the first communication node N1, wherein a comparison analysis is performed by an analysis unit 14. This comparison analysis could in a first embodiment shown in FIGS. 1 and 3 comprise the comparison 108 of the decoded single encoded sensor signal 1a' received from the second communication node N2 with a single encoded sensor signal 1a stored in the storing unit 12. In an alternative embodiment shown in FIGS. 2 and 3 the decoded single encoded sensor signal 1a' received from the second communication node N2 is first encoded with the second encoding scheme b in a second encoding unit 11'. The first encoding unit 11 and the second encoding unit 11' could be the same encoding unit or be separate encoding units as shown in FIG. 2. The formed double encoded sensor signal 1a'b is the compared 110 in the analysis unit 14 with the double encoded sensor signal 1ab stored in the storing unit 12.

The comparison performed in the analysis unit 14 is dependent on the implementation and data type of the signal. The data type may for example be a Boolean Value. For example, a Boolean Value may be encrypted in the first communication node N1, decrypted in the second communication node N2 and sent back to the first communication node for acknowledgment. In the first communication node N1 it is controlled if the received Boolean Value is the same as the stored Boolean Value or it is controlled that an encoded Boolean Value received is generating the stored encrypted Boolean value. The same applies for 4 bit, 8 bit, 16 bit signals, etc.

If the compared sensor signals 1a', 1a'b; 1a, 1ab match, then a signal is sent 111 to the second communication node N2 validating the sensor signal. It is thereby confirmed that the sensor signal has not been tampered with, e.g. through a hacker attack.

Upon receiving the validating signal from the first communication node N1 to the second communication node N2, a decoded single encoded sensor signal 1a stored in the second communication node N2 may be decoded based on the first encoding scheme a. Through this decoding process 113 performed in the second communication node N2, the original sensor signal 1 is obtained, based on which an action associated with the detected environmental information associated with the road vehicle may be initiated. The second communication node N2 may be associable with e.g. a control module of the road vehicle and may, based on the signal, perform an action associated with the detected environmental information associated with the road vehicle, e.g. blind spot alerting, automatic lane centring, automatic braking, traffic warnings, lane departure warning, automatic lighting, adaptive cruise control etc.

If the compared sensor signals 1a', 1a'b; 1a, 1ab do not match, i.e. they are not the same, this is a warning that the sensor signal has been subject to e.g. a hacker attack, and a corrective action is initiated 112. The corrective action may comprise resending the double encoded sensor signal 1ab from the first communication node N1 to the second communication node N2. The corrective action may alternatively comprise shutting down the present on-board sensor 10. By shutting down the sensor 10 the spread of a hacker attack to other systems in the vehicle and to other vehicles connected with the affected vehicle may be slowed down. Alternatively, security measures may be initialized without raising alarms so as to keep a hacker from realizing that the hackers foot prints are identified. There are many corrective actions possible, which depend on the implementation, circumstances and overall capability of the hardware, software and infrastructure involved. Yet an alternative corrective action is to shut down the road vehicle. By shutting down the road vehicle the spread of a hacker attack between connected road vehicles may be slowed down.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an arrangement or method to address each and every problem sought to be solved by the presently described concept, for it to be encompassed hereby.

The invention claimed is:

1. Method for encoding/decoding a signal at a first and second communication node in a road vehicle, the method comprising:

by means of an on-board sensor on said road vehicle, detecting environmental information associated with said road vehicle, in said first communication node:
encoding a signal representing said detected environmental information associated with said road vehicle using a first encoding scheme,
encoding a thus formed single encoded sensor signal using a second encoding scheme,
sending a thus formed double encoded sensor signal to said second communication node,
storing at least one of said single encoded sensor signal and said double encoded sensor signal in said first communication node,
in said second communication node:
decoding said double encoded sensor signal received from said first communication node based on said second encoding scheme, forming a decoded single encoded sensor signal,
sending said decoded single encoded sensor signal to said first communication node, and
in said first communication node:
performing a comparison analysis, comprising at least one of the following:
comparing said decoded single encoded sensor signal received from said second communication node with a stored single encoded sensor signal, or after encoding said decoded single encoded sensor signal received from said second communication node with said second encoding scheme, comparing said thus formed double encoded sensor signal with a stored double encoded sensor signal, wherein said compared sensor signals match, then sending a signal to the second communication node validating said sensor signal, if said compared sensor signals do not match, then initiating a corrective action.

2. The method of claim 1, wherein said comparison analysis comprises comparing said decoded single encoded sensor signal with a stored single encoded sensor signal.

3. The method of claim 1, wherein said comparison analysis comprises after encoding said decoded single encoded sensor signal received from said second communication node with said second encoding scheme, comparing said thus formed double encoded sensor signal with a stored double encoded sensor signal.

4. The method of claim 1, wherein said first encoding scheme is a sensor identification code.

5. The method of claim 1, wherein said second encoding scheme is an encryption based on a vehicle identification number of said road vehicle.

6. The method of claim 5, wherein an encryption key used in said encryption is based on one or more of: date of manufacture of said on-board sensor, date of installation of said on-board sensor in said road vehicle, location of manufacturing of said on-board sensor, location of installation of said on-board sensor in said road vehicle, an on-board sensor manufacturing property, and an on-board sensor installation property.

7. The method of claim 5, wherein said encryption is performed using an advanced encryption standard method.

8. The method of claim 5, wherein said encryption includes a dynamically changing encryption key.

9. The method of claim 1, wherein said corrective action comprises resending said double encoded sensor signal from said first communication node to said second communication node.

10. The method of claim 1, wherein said corrective action comprises shutting down said on-board sensor.

11. The method of claim 1, wherein said corrective action comprises shutting down said road vehicle.

12. The method of claim 1, wherein upon receiving said validating signal from said first communication node in said second communication node, decoding a decoded single encoded sensor signal stored in said second communication node based on said first encoding scheme, and initiating an action based on a thus formed double decoded sensor signal.

13. Arrangement for encoding/decoding a signal at a first and second communication node in a road vehicle, wherein said arrangement comprises:
- a first communication node and a second communication node,
- at least one on-board sensor on said road vehicle, arranged to detect environmental information associated with said road vehicle, wherein said first communication node is arranged to:
- in a first encoding unit, encode a signal representing said detected environmental information associated with said road vehicle using a first encoding scheme, and further encode said formed single encoded sensor signal using a second encoding scheme, and send a thus formed double encoded sensor signal to said second communication node, and
- in a storing unit store at least one of said single encoded sensor signal and said double encoded sensor signal, wherein said second communication node is arranged to in a decoding unit decode said double encoded sensor signal received from said first communication node based on said second encoding scheme, forming a decoded single encoded sensor signal, and send said decoded single encoded sensor signal said first communication node, wherein said first communication node further is arranged to in an analysis unit perform a comparison analysis comprising at least one of the following actions:
- compare said decoded single encoded sensor signal received from said second communication node with a single encoded sensor signal stored in said storing unit, or compare, subsequent to encoding said decoded single encoded sensor signal received from said second communication node with said second encoding scheme in a second encoding unit, a thus formed double encoded sensor signal with a double encoded sensor signal stored in said storing unit, wherein if said compared sensor signals match, then send a signal to said second communication node validating said sensor signal, if said compared sensor signals do not match, then initiate a corrective action.

14. The arrangement of claim 13, wherein said first and second encoding units is the same encoding unit.

15. A road vehicle comprising said arrangement for encoding/decoding a signal at a first and second communication node according to claim 13.

* * * * *